July 11, 1961 G. DEARSLEY 2,991,753
ADHESIVE APPLYING APPARATUS
Filed July 11, 1958

INVENTOR.
GEORGE DEARSLEY
BY
ATTORNEY

2,991,753
ADHESIVE APPLYING APPARATUS
George Dearsley, Raleigh, N.C., assignor to American Machine & Foundry Company, a corporation of New Jersey
Filed July 11, 1958, Ser. No. 750,063
9 Claims. (Cl. 118—262)

This invention relates to adhesive feeding mechanisms and is particularly advantageous with respect to cigarette making machines.

In the past it has been the practice to run gum wheels or rollers in a bath of adhesive contained in a suitable receptacle and to scrape off the surplus gum to provide a film which is eventually transferred to the endless web or article to be gummed. This had many disadvantages, as for example constant attention is necessary in order to maintain a supply of adhesive in the gum pot, foreign matter entering the gum pot eventually reaches such proportions that the gum is rendered unfit for use, the viscosity of the gum is liable to change due to evaporation, and if the machine should be stopped for any purpose whatsoever, adhesive is liable to dry on the gum roller and make it difficult or even impossible to restart the machine without cleaning the rollers.

It is therefore an object of this invention to provide a gum or adhesive applying machine which will be trouble free in operation and will be ready to start operating immediately, even if the cigarette machine had to be stopped temporarily.

A further object is to provide a paste pot wherein the paste or gum is maintained at a constant level from where it is removed by rotating a paste wheel.

Another object is to provide a paste applying apparatus wherein there will be a primary and a secondary reservoir of paste and a constant circulation of paste between both reservoirs.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 1:
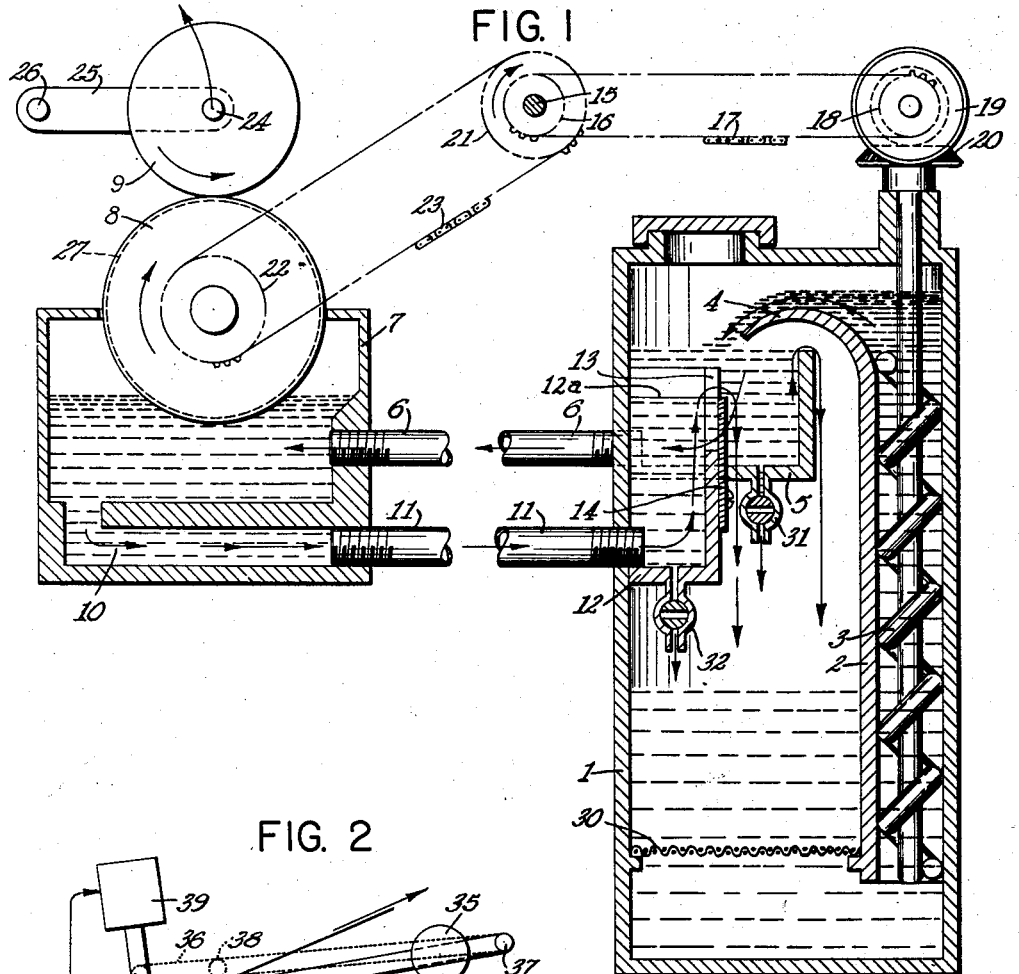
FIGURE 1 shows a diagrammatic arrangement of the proposed device.

Referring to FIGURE 1, a large receptacle is provided which will hold a supply of paste or adhesive at least sufficient for one day's running, and preferably more. This container is provided with a circular channel 2, reaching from near the bottom to near the top. Into this channel is loosely fitted an Archimedian screw which is used to lift the adhesive from a lower level to a higher level. This is employed because of its simplicity and because it can be constructed in such a manner that the support bearings for driving may be remote from the adhesive, thus avoiding any possibility of leakage.

However, it will be appreciated that any type of pump would be satisfactory. Experience has shown that the screw device is perfectly adequate for lifting adhesive of the viscosity normally employed in most machines. The screw 3 is run at a sufficient speed to lift a quantity of adhesive far in excess of that required, which adhesive flows through the spout member 4 into an open well or primary reservoir 5. From here a large bore tube 6 connects to the adhesive paste or gum pot container proper 7, in which the gum roller 8 revolves to transfer a film of gum onto the roller 9, from which it is transferred to the endless web of uniting band material.

The adhesive paste or gum adhesive entering the pot 7 via the tube 6 flows across the pot and drains through the channel 10, from which it is conducted via the pipe 11 into another open well secondary reservoir 12 situated inside the main enclosure 1. In FIG. 1, the upper edge 12a of open well 12 is indicated. In the side of the open well or secondary reservoir 12 is provided a slot 13 which is partially covered by an adjustable gate such as plate 14, the purpose of this arrangement being to provide an adjustable height to the opening in the bottom of the slot 13, which is obtained by moving the plate 14 to the required position. The whole of the apparatus is driven by a shaft 15, which is mechanically connected to an electric motor or other such device which will be arranged to run separately from the machine itself so that the apparatus described will run independently of the machine and continue to do so even when the main machine is stopped. By means of the sprocket 16 and the chain 17, the sprocket 18 is driven, which is fastened to the bevel gear 19, which in turn drives the gear 20 to drive the screw 3.

The shaft 15 also carries the sprocket 21, which drives the sprocket 22 by means of the chain 23 which causes the gum wheel 8 to rotate in the gum bath. The gum wheel 9 is running idle on its bearings 24, being supported by an arm 25 which is pivoted about a point 26. This gum wheel 9 is thus constrained to run in a position parallel to a gum wheel 8, but being pivoted about a point 26, its own weight causes it to press closely against wheel 8 and so be driven by friction by means of this contact.

Figure 3:
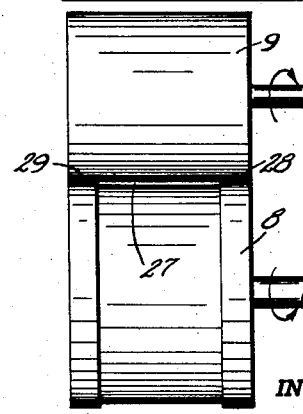
FIGURE 3 shows details of the gum rollers themselves.

Referring to FIGURE 3, which shows a side view of wheels 8 and 9, it will be seen that wheel 8 has a shallow recess 27 provided in the center thereof. The wheel 9 presses onto the end portions 28 and 29 of the wheel 8, leaving a gap dependent on the recess 27 which determines the thickness of gum film transferred on the wheel 9.

The apparatus functions as follows: Adhesive lifted from the lower portion of the main enclosure 1 by a suitable pump, such as the screw 3 flows via the spout 4 into the open well 5. Because the quantity of adhesive being delivered is excessive of the requirements, a portion of the adhesive will overflow the edges of the well 5 and drip down to the bottom of the main container again. Adhesive flows through the pipe 6 into the gum pot back through pipe 11 into the open well 12. The plate 14, controlling the overflow point of the well 12, is set to the required position so that the height of the adhesive in the well 12, which under these conditions is also the height of the adhesive in the gum pot container 7, is suitable for the purpose at hand. Because the height of the overflow lip of the well 5 is above the height of the adjustable overflow lip of the well 12, adhesive will constantly circulate by gravity, thus insuring that a sufficient supply of adhesive is in the pot container 7 at all times, and that adhesive is in a fresh condition.

The upper surface of the gum pot container 7 is higher than the overflow lip of the well 5, the purpose of this being that should the return pipe 11 ever become choked for any reason, the level of adhesive arriving in pot container 7 can never be higher than the overflow lip of the well 5, thus making it quite impossible for the pot container 7 to overflow under any circumstances. Thus, should the return pipe 11 become choked, the machine may be kept in operation until suitable time can be spared for the cleaning, for the pot will continue to be supplied through the pipe 6, although the adhesive will not continue to circulate as is to be preferred.

Adhesive dripping back into the main container from the two open wells 5 and 12 must pass through the screen 30, secured to the main container wall and circular channel 2 in the path of the circulating adhesive, before being again recirculated. Thus any contamination of adhesive is not cumulative in the gum pot as is the case with previous devices, but the adhesive is being constantly filtered through the screen 30 to insure that it is in clean condition at all times.

It will be appreciated that by pumping a surplus of adhesive and circulating it in the manner described, the material is constantly stirred and kept in a thoroughly mixed condition at all times, thus making quite sure that the adhesive delivered to the final gum roller 9 remains in a constant condition over long periods of time. In the event that it becomes necessary to clean the gum pot container 7, the valves 31 and 32 are provided, which upon opening will permit the whole of the adhesive contained in the overflow wells, together with that contained in the pot container 7 to drain back into the main enclosure 1. This, of course, provides a considerable economy in adhesive, although it has been found with this device that the pot container 7 requires cleaning very infrequently, for the whole system is made almost completely enclosed so that contamination and drying out is kept to a minimum. It will be noted that the pipes 6 and 11, together with the filter screen 30, are completely submerged in adhesive at all times, so that there is no tendency whatsoever for these parts to become choked or encrusted with dried adhesive, which would be the case if they were periodically opened to the atmosphere.

Figure 2:
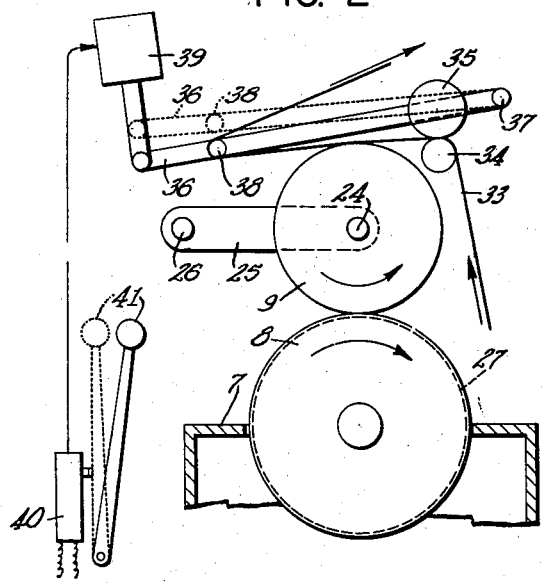
FIGURE 2 shows one way of lifting the uniting band web from the gum roller.

As described above, the whole of this mechanism runs continually. The uniting band web which is to be gummed ceases to run when the machine proper is stopped. If this stationary web is left in contact with the moving gum roller 9, it will pick up a surplus of gum at one point. This would interfere with the proper working of the machine upon starting and if left for long would probably build up to such an extent that the web would be dragged around the roll 9 to completely jam the mechanism. To avoid this difficulty the web must be automatically lifted clear of the gum roller when the machine is stopped, and it is also desirable to make it possible to lift the web away from the gum roller manually at any time so that the machine may be adjusted without running the uniting band web. One way of accomplishing this is shown at FIGURE 2.

Here the gum rollers 8 and 9 are shown as before. The uniting band web 33 is pulled from a bobbin, not shown, by means of the driven roller 34 and the resilient presser roll 35. The roller 34 is so dimensioned and driven that it delivers the correct length of uniting band 33 for each revolution. The roller 35 is mounted on an arm 36, which is pivoted at 37. This arm also carries another roller 38 around which the uniting band web passes as shown. As will be seen, the dispositon of the rollers 34 and 38 relative to the gum roller 9 is such that the web passes over the gum roller 9, picking up gum on the way. It will also be clear that if provision is made to lift the lever 36 to the position shown in chain dotted lines, the web passing between rollers 34 and 38 will also be lifted clear of the roller 39 and simultaneously the pressure between the roller 35 and feed roll 34 will also be removed. In this way the lifting of the lever 36 removes the web from the gum roller and at the same time stops it from being fed by the roller 34.

The moving of the lever 36 can easily be accomplished manually, and by a variety of methods it can also be moved automatically. The method shown in FIGURE 2 is to use a solenoid 39, which is energized by a micro-switch 40, which in turn is operated by the lever 41, which operates the clutch of the main machine. In this way when the machine is functioning, the lever 41 is clear of the micro-switch 40 and the solenoid is not energized, permitting the lever 41 to fall to its lowest position.

Upon stopping the machine, the operator moves the clutch lever into the off position, where it contacts the micro-switch 40 to energize the solenoid 39 and lift the lever 36.

The invention hereinabove described may therefore be varied in construction within the scope of the claims, for the particular device selected to illustrate the invention is but one of many possible embodiments of the same. The invention, therefore, is not to be restricted to the precise details of the structure shown and described.

What is claimed is:

1. In a paste applying apparatus, a closed bottom paste container, a paste pickup wheel rotating in said container, a pair of vertically spaced primary and secondary supply reservoirs disposed laterally of said container, said primary reservoir being on a higher plane than the secondary reservoir, means connecting the primary reservoir to said container for controlling the delivery of paste into said container at one elevation and means for maintaining a constant level of paste in said container and for controlling the removal of paste from said container into the secondary reservoir at a second elevation and mechanism for causing paste to flow into the primary reservoir from which paste is delivered to said container.

2. An adhesive applier for a cigarette making machine comprising, an adhesive container, paste wheel rotating in said container for picking up a quantity of adhesive therefrom, a pair of inflow and outflow conduits connected at one end to said container, an enclosure disposed on one side of said container, a primary and a secondary adhesive reservoir secured inwardly of said enclosure, said primary adhesive reservoir being on a higher plane than the secondary reservoir and said primary and secondary reservoirs being connected to the opposite ends of said conduits to cause a gravity flow of adhesive from said primary reservoir through the inflow conduit into said container and out through the outflow conduit into said secondary reservoir, pump means for bringing adhesive from said enclosure to said primary supply reservoir, and vertically adjustable means positioned on the side of said secondary supply reservoir for maintaining a constant pretermined level of adhesive in said container.

3. An adhesive applier having the features provided for in claim 2 wherein a gate is provided to allow all adhesive in excess of a predetermined amount to flow from the secondary reservoir connected to said outflow conduit to the enclosure.

4. An adhesive applier having the features provided for in claim 3 wherein a filter screen is positioned in the path of the circulating adhesive in the lower part of said enclosure to remove any material that will not pass through said screen.

5. An adhesive applier having the features provided for in claim 3 wherein valves are fitted to said primary and secondary reservoirs to permit them to be completely drained.

6. An adhesive applier having a paste container, a paste pickup wheel, a transfer wheel for removing paste from said pickup wheel, means for rotating said paste pickup wheel in said paste container, ducts connected with said paste container for delivering paste into said container through one duct and for removing paste from said paste container through the other duct, independent paste leveling reservoirs connected with said ducts and positioned on different horizontal planes for controlling the height of the paste in said paste container and a pump for causing a flow of paste into the reservoir located at the higher horizontal plane, an enclosure for said paste leveling reservoirs.

7. An adhesive applying apparatus having the features provided for in claim 6 wherein the pump is provided with an inlet opening, and a filter screen is secured in said enclosure in the path of flow of the adhesive.

8. An adhesive applier having the features provided for in claim 6 wherein said lower of said paste leveling reservoirs has an overflow so that the excess paste in said lower reservoir can flow over said overflow.

9. An adhesive applier having the features provided for in claim 8 wherein the lower of said paste leveling reservoirs has an adjustable gate for controlling the level of paste in said container.

References Cited in the file of this patent

UNITED STATES PATENTS

| | | |
|---|---|---|
| 913,008 | Herr | Feb. 23, 1909 |
| 1,997,390 | Paridon | Apr. 9, 1935 |
| 2,157,724 | Zablocki | May 9, 1939 |
| 2,185,859 | Massey | Jan. 2, 1940 |
| 2,641,220 | Weber et al. | June 9, 1953 |
| 2,649,758 | Cowgill | Aug. 25, 1953 |
| 2,775,954 | White et al. | Jan. 1, 1957 |